United States Patent Office  3,834,866
Patented Sept. 10, 1974

3,834,866
OXIDATION DYE COMPOSITIONS CONTAINING 5-AMINOGUAIACOLS AS COUPLERS
Franz Pum, Glen Ellyn, Ill., assignor to Alberto-Culver Company, Melrose Park, Ill.
No Drawing. Filed Apr. 4, 1972, Ser. No. 241,086
Int. Cl. D06p 1/32, 3/08
U.S. Cl. 8—11   12 Claims

ABSTRACT OF THE DISCLOSURE

The synthesis of 5-aminoguaiacol derivatives of the formula

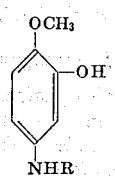

wherein R is alkyl, acetyl, carbamylmethyl or β-hydroxyethyl, wherein the alkyl radical contains 1 to 4 carbon atoms, is described, as well as aqueous dye solutions for human hair containing said 5-aminoguaiacol derivatives and dye bases derived from o- and p-phenylenediamines and from o- and p-aminophenols.

The present invention relates to the preparation and use of coupling agents derived from 2-methoxy-5-aminophenol in dye compositions for keratinous fibers, particularly human hair.

BACKGROUND OF THE INVENTION

The dyeing process known in the art comprises the use of certain so-called dye "bases" which are ortho and para phenylenediamines, ortho and para amino phenols, ortho and para diaminopyridines or ortho and para aminohydroxypyridines, which in themselves are colorless, to develop color upon contact with an oxidizing agent such as hydrogen peroxide or air. The dyeing process also comprises the use of so-called "couplers" as color modifiers which are aromatic metadiamines or metaaminophenols.

BRIEF DESCRIPTION OF THE INVENTION

According to the present invention there is provided a dyeing composition suitable for dyeing keratinous fibers, particularly human hair, which comprises at least one aromatic compound (dye base) having two amino groups or one amino group and one hydroxyl group, the two groups being ortho or para to each other, and at least one coupling agent having the general formula

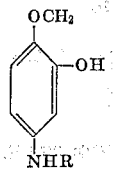

in which R represents a hydrogen atom, an alkyl or hydroxyalkyl radical having 1 to 4 carbon atoms, an acetyl radical, a radical of the formula —CO—NHR′, R′ being an alkyl group having 1 to 3 carbon atoms, or a radical of the formula $$-CH_2-CON\begin{matrix}R''\\R'''\end{matrix}$$

in which R″ and R‴ may be hydrogen or the same or different alkyl radicals having 1 to 3 carbon atoms.

Preferred coupling agents of the generic formula I are 5-aminoguaiacol, 5-acetamidoguaiacol, 5-beta-hydroxyethylaminoguaiacol and 3-hydroxy-4-methoxyanilinoacetamide.

The weight ratio of dye base and coupler may vary to a great extent, for example, 10:1, 1:2, or 2:1, the preferred ratio being 2:1.

The dyeing composition of this invention may also contain wetting agents, dispersing agents, penetrating agents, and other ingredients used in conventional hair dye compositions. The hair dye composition may also contain other dyestuffs such as nitro, azo and anthraquinone dyes.

The dyeing composition may also be applied in various forms such as viscous solution or suspension, gel, cream or in aerosol form.

The dyeing compositions of this invention are usually applied at an alkaline pH (at least pH 7), the preferred range being pH 8.5 to 10, using ammonia, monoethanolamine, diethanolamine or other aliphatic or cycloaliphatic amines to adjust the pH, the preferred agent being ammonia. The alkaline solution may be applied in the presence of oxidizing agents, such as hydrogen peroxide in 6% to 16% strength. The mixture of hair dye composition and oxidizing agent is applied to the hair at temperatures between 15° C. and 40° C. and left there for 5 to 30 minutes. The hair is then rinsed, washed and dried.

The use of these new coupling agents makes new shade variations attainable in particular reddish shades without the use of 2-nitro-p-phenylenediamine. They have good stability to shampooing, light, and weathering.

The following examples illustrate the invention unless otherwise stated, the quantities of materials are in parts by weight.

EXAMPLE 1

5-Aminoguaiacol Hydrochloride

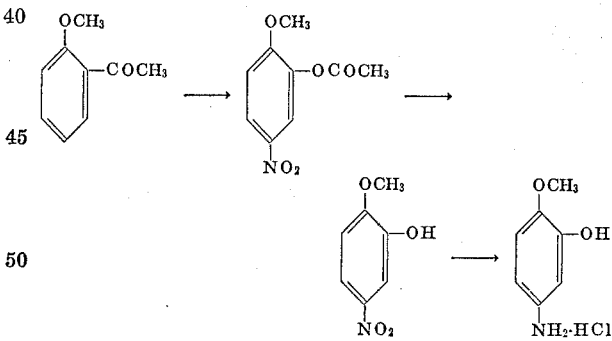

Step 1—Preparation of 5-nitroguaiacol 83 g. (0.5 mol) of o-methoxyphenyl acetate was dissolved in 160 ml. of glacial acetic acid and placed in a 4-liter open reaction vessel equipped with a mechanical stirrer and a thermometer. 80 ml. of 90% concentrated nitric acid in 120 ml. of glacial acetic acid was added. The mixture was stirred and heated to 55° C. The heat source (steam bath) was removed and the temperature rose to 105° C. to 107° C., expelling a large amount of nitrous fumes. After cooling, the reaction mixture was poured into 3 liters of ice water and the crystalline solids filtered off and washed thoroughly with water. The moist filter cake was suspended in 1000 ml. of 5% sodium hydroxide solution and heated with stirring at 60° C. until all was dissolved. The cooled reaction mixture was acidified with concentrated hydrochloric acid and the precipitated product filtered off and dried. It may be recrystallized from carbon tetrachloride.

Yield: 42 g.=50% (based on o-methoxyphenyl acetate)
Melting point 105°–106.5° C.

Step 2.—Preparation of 5-aminoguaiacol hydrochloride 16.9 g. (0.1 mol) of 5-nitroguaiacol was suspended in 100 ml. ethanol, 100 ml. H₂O and 9 ml. concentrated hydrochloric acid. 300 mg. of 5% Pt/C catalyst as an aqueous slurry was added and the nitro-group reduced with hydrogen in a Parr shaker. The reduction was finished after 1½ hours. The reaction mixture was filtered and evaporated to dryness in vacuo. The dry 5-aminoguaiacol hydrochloride crystallized slowly on standing. The hydrochloride has a decomposition point of around 180° C. and the yield was quantitative.

EXAMPLE 2

5-Acetamidoquaiacol

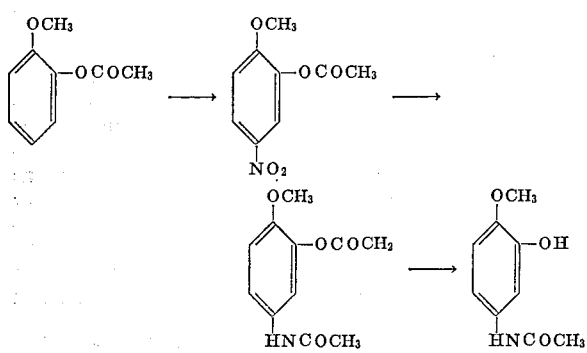

Step 1—Preparation of 5-nitroguaiacol acetate 80 g. of 2-methoxyphenyl acetate was dissolved in 160 ml. of glacial acetic acid and placed in an open four-liter reaction vessel equipped with stirrer and thermometer. A cold solution of 80 ml. of 90% nitric acid in 120 ml. of glacial acetic acid was added. The mixture was heated with stirring to 48° C. and then the heat source was removed. The exothermic reaction started slowly and after having reached 70° C. (4 min.) went up very fast to 105°–108° C. with a strong emission of nitrous fumes. After the reaction mixture cooled down to 90° C. it was quenched in 2.5 liters of ice water. The reaction product was filtered off, washed thoroughly with water and recrystallized from methanol.

Yield: 45.8 g.=46%
Melting point 101.5°–103° C.

Step 2—Preparation of 5-acetamidoguaiacol acetate 10.55 g. (0.05 mol) of 5-nitroguaiacol acetate was dissolved in a mixture of 40 ml. acetic anhydride and 100 ml. glacial acetic acid. 500 mg. Pt/C (5%) slurried in a little glacial acetic acid and 5 drops of 70% perchloric acid was added. This mixture was reduced in a Parr hydrogenator. After filtration the reaction mixture was evaporated to dryness in vacuo.

Yield: 11 g.=98.7%

A sample was recrystallized from water and had a melting point of 160°–161° C.

Step 3—5-Acetamidoguaiacol 10 g. of 5-acetamidoguaiacol acetate was slurried in a solution of 15 g. sodium carbonate in 80 ml. of water and heated to reflux for 1½ hours. After cooling the reaction mixture was made neutral with hydrochloric acid and the precipitated product recrystallized from water.

Yield: 6.8 g.=84%
Melting point 176.5°–178° C.

EXAMPLE 3

3-Hydroxy-4-methoxy-anilinoacetamide

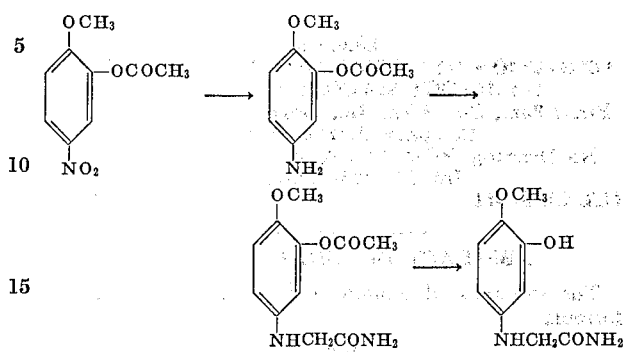

Step 1—Preparation of 5-aminoguaiacol acetate 21 g. (0.1 mol) of 5-nitroguaiacol acetate was dissolved in 250 ml. isopropanol and 500 mg. Pt/C (5%) slurried in a little water was added. The hydrogenation was performed in a Parr hydrogenator. After filtration the solvent was removed and the product melted after recrystallization from benzenecyclohexane at 80.5°–82° C.

Yield: 17.1 g.=94.5%

Step 2—Preparation of 3-acetoxy-4-methoxyanilinoacetamide 9.05 g. (0.05 mol) of 5-aminoguaiasol acetate and 5.05 g. (0.54 mol) of chloroacetamide were slurried in 100 ml. of water and heated to reflux with stirring and a slurry of 3.7 g. (0.037 mol) of calcium carbonate in 10 ml. of water dropped in slowly. After one hour the reaction mixture was filtered hot and after cooling extracted with isopropyl acetate. The solvent was removed in vacuum and the remaining heavy oil solidified on contact with little water.

Yield: 4.8 g.=40%
Melting point (from water) 152°–155° C.

Step 3—Preparation of 3-hydroxy-4-methoxyanilinoacetamide 11.9 g. (0.05 mol) of 3-acetoxy-4-methoxyanilinoacetamide was slurried in 100 ml. of 1% sodium carbonate solution and refluxed for one hour. The reaction mixture was neutralized with 10% hydrochloric acid and evaporated to dryness. The solid residue was several times extracted with boiling chlorobenzene and the product crystallized out on cooling and was filtered and dried.

Yield: 6.3 g.=65%
Melting point 153°–156° C.

EXAMPLE 4

5-Betahydroxymethylaminoquaiacol

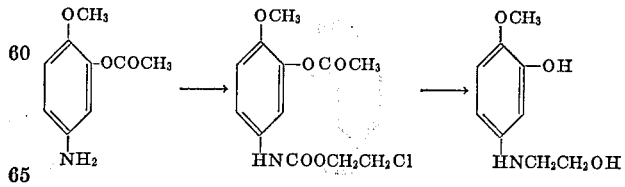

Step 1—Preparation of beta-chloroethyl N-(3-acetoxy-4-methoxyphenyl)carbamate 9.05 g. (0.05 mol) of 5-aminoguaiacol acetate and 3.7 g. (0.037 mol) calcium carbonate were dissolved in 100 ml. methyl isobutyl ketone and brought to reflux with stirring. 8.5 g. (0.06 mol) of beta-chloroethyl chloroformate was dropped in very slowly and refluxing continued for another 1½ hours. The reaction mixture was filtered hot and on cooling the reaction product crystallized out and was filtered, then recrystallized from ethanol.

Yield: 9.4 g.=65.5%
Melting point 131°–132.5° C.

Step 2—Preparation of 5-beta-hydroxyethylaminoguaiacol hydrochloride 2.87 g. (0.01 mol) of beta-chloroethyl N-(3-acetoxy-4-methoxyphenyl)carbamate was placed in a 100 ml. flask equipped with a gas inlet tube, reflux condenser and dropping funnel. Nitrogen was passed through at all times. 30 ml. of 4 N sodium hydroxide solution was added and the mixture brought to reflux for one hour. After cooling the reaction mixture was acidified with 5 N hydrochloric acid, neutralized with sodium bicarbonate, and extracted with ethyl acetate. The ethyl acetate layer was dried over sodium sulfate and the base precipitated as the hydrochloride with ether/HCl.

Yield: 1.4 g.=60%
Melting point 127°–130° C.

EXAMPLE 5

The following dye solution was prepared:

| | |
|---|---|
| Para-phenylenediamine | 1.0 |
| 3-Hydroxy-4-methoxyanilinoacetamide | 0.5 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. | 100.0 |

The solution was mixed with an equal amount of aqueous hydrogen peroxide (6% by wt.) and applied on white virgin human hair for 20 minutes. After cooling and drying a dark reddish brown shade was produced.

EXAMPLE 6

The following dye solution was prepared:

| | |
|---|---|
| Para-phenylenediamine | 0.16 |
| 2,6-Tolylenediamine | 0.16 |
| 3-Hydroxy-4-methoxyanilinoacetamide | 0.06 |
| Ammonium lauryl sulfate (30% active) | 25.00 |
| Amonium oleate | 6.00 |
| Isopropanol | 10.00 |
| Sodium sulfite | 0.40 |
| Ammonia (28%) | 4.00 |
| Water Q.s. | 100.00 |

The dye solution was mixed with an equal amount of aqueous hydrogen peroxide (6% by wt.) and applied to white virgin human hair for 20 minutes resulting in a blue smoky shade.

EXAMPLE 7

The following dye solution was prepared:

| | |
|---|---|
| Para-aminophenol | 0.4 |
| Ortho-aminophenol | 1.0 |
| 3-Hydroxy-4-methoxyanilinoacetamide | 0.6 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. | 100.0 |

The solution, mixed with an equal amount of aqueous hydrogen peroxide, was applied to white virgin human hair for 20 minutes. A reddish blonde shade was produced.

EXAMPLE 8

The following dye solution was prepared:

| | |
|---|---|
| 2,5-Diaminoanisole sulfate | 0.4 |
| 3-Hydroxy-4-methoxyanilinoacetamide | 0.4 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. | 100.0 |

The solution was mixed with an equal amount of aqueous hydrogen peroxide (6% by wt.) and applied to white virgin human hair for 20 minutes. After washing and drying a violet shade was produced.

EXAMPLE 9

The following dye solution was prepared:

| | |
|---|---|
| Para-phenylenediamine | 0.80 |
| 3-Hydroxy-4-methoxyanilinoacetamide | 0.14 |
| 4-Nitro-1,3-phenylenediamine | 0.60 |
| Ammonium lauryl sulfate (30% active) | 25.00 |
| Ammonium oleate | 6.00 |
| Isopropanol | 10.00 |
| Sodium sulfite | 0.40 |
| Ammonia (28%) | 4.00 |
| Water Q.s. | 100.00 |

The solution, mixed with an equal amount of aqueous hydrogen peroxide (6% by wt.), was applied on white virgin human hair for 20 minutes and a medium ash brown shade was produced.

EXAMPLE 10

The following dye solution was prepared:

| | |
|---|---|
| Para-phenylenediamine | 1.0 |
| 5-Aminoguaiacol hydrochloride | 1.0 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. | 100.0 |

The solution, mixed with an equal amount of aqueous hydrogen peroxide (6% by wt.), and applied to white virgin human hair for 20 minutes produced a very dark maroon shade.

EXAMPLE 11

The following dye solution was prepared:

| | |
|---|---|
| Para-aminophenol | 1.0 |
| 5-Aminoquaiacol hydrochloride | 1.0 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. | 100.0 |

The solution was mixed with an equal amount of aqueous hydrogen peroxide (6% by wt.) and applied to white virgin human hair for 20 minutes resulting in a golden reddish shade.

EXAMPLE 12

The following dye solution was prepared:

| | |
|---|---|
| Para-phenylenediamine | 1.0 |
| 2,6-Tolylenediamine | 1.0 |
| 5-Aminoguaiacol hydrochloride | 0.5 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. | 100.0 |

The solution was mixed with an equal amount of aqueous hydrogen peroxide (6% by wt.) and applied on white virgin human hair for 20 minutes. The resulting shade was a blue black.

EXAMPLE 13

The following dye solution was prepared:

| | |
|---|---|
| 2,5-Diaminoanisole sulfate | 1.0 |
| 5-Aminoguaiacol hydrochloride | 0.5 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. 100.0 | |

The solution, mixed with an equal amount of aqueous hydrogen peroxide (6% by wt.) applied to white virgin human hair for 20 minutes produced a dark violet shade.

EXAMPLE 14

The following dye solution was prepared:

| | |
|---|---|
| Para-phenylenediamine | 1.0 |
| 5-Acetamidoguaiacol | 0.5 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. 100.0 | |

The solution, mixed with an equal amount of aqueous hydrogen peroxide (6% by wt.), and applied on white virgin human hair for 20 minutes produced a deep violet shade.

EXAMPLE 15

The following dye solution was prepared:

| | |
|---|---|
| Para-phenylenediamine | 1.0 |
| 4-Chlororesorcinol | 1.0 |
| 5-Acetamidoguaiacol | 0.2 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. 100.0 | |

The solution was mixed with an equal amount of aqueous hydrogen peroxide (6% by wt.) and applied to white virgin human hair for 20 minutes producing a dark ash brown shade.

EXAMPLE 16

The following dye solution was prepared:

| | |
|---|---|
| Para-aminophenol | 1.20 |
| 5-Acetamidoguaiacol | 0.60 |
| Ammonium lauryl sulfate (30% active) | 25.00 |
| Ammonium oleate | 6.00 |
| Isopropanol | 10.00 |
| Sodium sulfite | 0.40 |
| Ammonia (28%) | 4.00 |
| Water Q.s. 100.00 | |

The solution, mixed with equal parts of aqueous hydrogen peroxide (6% by wt.), applied to white virgin human hair for 20 minutes produced a reddish blonde shade.

EXAMPLE 17

The following dye solution was prepared:

| | |
|---|---|
| 2,5-Diaminoanisole sulfate | 0.60 |
| 5-Acetamidoguaiacol | 0.60 |
| Ammonium lauryl sulfate (30% active) | 25.00 |
| Ammonium oleate | 6.00 |
| Isopropanol | 10.00 |
| Sodium sulfate | 0.40 |
| Ammonia (28%) | 4.00 |
| Water Q.s. 100.00 | |

The solution, when mixed with equal amounts of aqueous hydrogen peroxide (6% by wt.) and applied to white virgin human hair for 20 minutes produced a blue smoke shade.

EXAMPLE 18

The following dye solution was prepared:

| | |
|---|---|
| Para-phenylenediamine | 1.0 |
| 5-Beta-hydroxyethylaminoguaiacol hydrochloride | 0.5 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. 100.0 | |

The solution, when mixed with equal parts of aqueous hydrogen peroxide (6% by wt.) and applied to white virgin human hair for 20 minutes, produced a dark warm brown shade.

EXAMPLE 19

The following dye solution was prepared:

| | |
|---|---|
| Para-aminophenol | 1.0 |
| 5-Beta-hydroxyethylaminoguaiacol hydrochloride | 0.6 |
| Ammonium lauryl sulfate (30% active) | 25.0 |
| Ammonium oleate | 6.0 |
| Isopropanol | 10.0 |
| Sodium sulfite | 0.4 |
| Ammonia (28%) | 4.0 |
| Water Q.s. 100.0 | |

The solution was mixed with equal amounts of aqueous hydrogen peroxide (6% by wt.) and applied to white virgin human hair for 20 minutes imparting a reddish blonde shade.

EXAMPLE 20

The following dye solution was prepared:

| | |
|---|---|
| Para-phenylenediamine | 0.16 |
| Ortho-aminophenol | 0.40 |
| 5 - Beta - hydroxyethylaminoguaiacol hydrochloride | 0.08 |
| Ammonium lauryl sulfate (30% active) | 25.00 |
| Ammonium oleate | 6.00 |
| Isopropanol | 10.00 |
| Sodium sulfite | 0.40 |
| Ammonia (28%) | 4.00 |
| Water Q.s. 100.00 | |

The solution was mixed with equal amounts of aqueous hydrogen peroxide (6% by wt.) and applied to white virgin human hair for 20 minutes producing a dark ash blonde shade.

EXAMPLE 21

The following dye solution was prepared:

| | |
|---|---|
| Para-phenylenediamine | 0.30 |
| Para-nitro-o-phenyenediamine | 0.14 |
| 5 - Beta - hydroxyethylaminoguaiacol hydrochloride | 0.14 |
| Ammonium lauryl sulfate (30% active) | 25.00 |
| Ammonium oleate | 6.00 |
| Isopropanol | 10.00 |
| Sodium sulfite | 0.40 |
| Ammonia (28%) | 4.00 |
| Water Q.s. 100.00 | |

The solution, when mixed with equal parts of aqueous hydrogen peroxide (6% by wt.) and applied on white virgin human hair for 20 minutes, imparted a light golden brown shade.

EXAMPLE 22

The following dye solution was prepared:

| | |
|---|---|
| Para-aminophenol | 1.20 |
| 5-Methylaminoguaiacol | 0.60 |
| Ammonium lauryl sulfate (30% active) | 25.00 |
| Ammonium oleate | 6.00 |
| Isopropanol | 10.00 |
| Sodium sulfide | 0.40 |
| Ammonia (28%) | 4.00 |
| Water Q.s. 100.00. | |

The solution, mixed with equal parts of aqueous hydrogen peroxide (6% by wt.), applied to white virgin human hair for 20 minutes produced a reddish blonde shade.

EXAMPLE 23

The following dye solution was prepared:

| | |
|---|---|
| 2,5-Diaminoanisole sulfate | 0.60 |
| 5-Ethylaminoguaiacol | 0.60 |
| Ammonium lauryl sulfate (30% active) | 25.00 |
| Ammonium oleate | 6.00 |
| Isopropanol | 10.00 |
| Sodium sulfate | 0.40 |
| Ammonia (28%) | 4.00 |
| Water Q.s. 100.0. | |

The solution, when mixed with an equal amount of 6% aqueous hydrogen peroxide and applied to white virgin human hair for 20 minutes, a blue smoke shade was produced.

The 5-aminoguaiacol coupling agent disclosed herein can be combined with one or more of any of the o- or p-diamino or o- or p-aminohydroxy benzene derivatives as dye bases. These dye bases constitute a broad class of known compounds, wherein additional substituents in the benzene ring include not only methyl and methoxyl groups as illustrated in the examples but also halogen, particularly chlorine, trifluoromethyl, ethyl and higher alkyl radicals and ethoxyl and higher alkoxyl radicals.

The dye bases can also be pyridine derivatives instead of benzene derivatives. For instance, they include 2,5-diaminopyridine and 2-amino-5-hydroxypyridine.

The preferred dye bases which are used in the present invention comprise para-phenylenediamine, para-aminophenol, 2-chloro-para-phenylenediamine, 2,5-diaminoanisole, 2-fluoro-para-phenylenediamine, 2-trifluoromethyl-para-phenylenediamine, 2,5-diaminopyridine, ortho-phenylenediamine, and ortho-aminophenol. Other aromatic and hetero-aromatic compounds which contain amino and hydroxyl groups in ortho or paraposition are also within the scope of this invention.

The 5-aminoguaiacol coupling agents as illustrated by the general formula I in column 1 can contain other substituents represented by R, such as propionyl, butyryl, β-hydroxypropyl and β-hydroxybutyl. The propionyl and butyryl compounds are synthesized by the procedure of Example 2, but propionic anhydride and acid or butyric anhydride and acid are used in step 2 in lieu of acetic anhydride and acid. The β-hydroxypropyl and β-hydroxybutyl compounds are prepared by the method of Example 4 by substituting β-chloropyropyl chloroformate or β-chlorobutyl chloroformate for β-chloroethyl chloroformate in step 1.

I claim:

1. An aqueous dy solution for keratinous fibers particularly human hair, containing one or more coupling agents, one or more of which being a 5-aminoquaiacol of the general formula

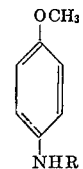

wherein R is hydrogen, alkyl, acetyl, carbamylmethyl, or hydroxylalkyl, and at least one dye base of aromatic or heteroaromatic character and having two amino groups or one amino and one hydroxy group, the two groups being ortho or para to each other on the same ring.

2. A composition according to claim 1 wherein the base is para-phenylenediamine, para-aminophenol, 2-chloro-para-phenylenediamine, 2-fluoro-para-phenylenediamine, 2,5-diaminoanisole, 2-trifluoromethyl-para-phenylenediamine, 2,5-diaminopyridine, ortho-phenylenediamine and ortho-aminophenol.

3. A composition according to claim 2 wherein the ratio (by weight) of the dye base to the coupling agent is in the range from 10:1 to 1:2.

4. An aqueous dye solution as defined by claim 1 wherein the coupling agent is 5-aminoguaiacol.

5. An aqueous dye solution as defined by claim 1 wherein the coupling agent is 5-acetamidoguaiacol.

6. An aqueous dye solution as defined by claim 1 wherein the coupling agent is 5-carbamylmethylaminoguaiacol.

7. An aqueous dye solution as defined by claim 1 wherein the coupling agent is 5-β-hydroxyethylaminoguaiacol.

8. An aqueous dye solution as defined by claim 1 wherein the coupling agent is 5-alkylaminoguaiacol.

9. A composition according to claim 1 which contains also Nitro-dyes as known in the art, and azo- and anthraquinone dyestuffs.

10. an aqueous dye solution as defined by claim 1 which contains several bases and couplers.

11. An aqueous dye solution according to claim 1 having a pH of 8.5 to 10.

12. A dye composition as defined by claim 1 where the composition is in form of an aqueous viscous solution or suspension gel, cream or aerosol foam.

References Cited

FOREIGN PATENTS 1,079,553   8/1967   Great Britain _____ 8—11

OTHER REFERENCES

Jona et al., "Chloroquaiacols," Gazetta Chimica Italiana, vol. 41, No. 1, 1911, pp. 722–737.

HERBERT B. GUYNN, Primary Examiner

B. H. HESS, Assistant Examiner

U.S. Cl. X.R.

260—558, 559, 573, 574

PO-1050
(5/69)

UNITED STATES PATENT OFFICE
CERTIFICATE OF CORRECTION

Patent No. 3,834,866      Dated September 10, 1974

Inventor(s) Franz Pum

It is certified that error appears in the above-identified patent and that said Letters Patent are hereby corrected as shown below:

Column 10, line 5, "dy" should read -- dye --.

Column 10, after line 8, the structural formula should read

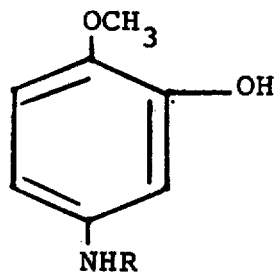

Signed and sealed this 24th day of December 1974.

(SEAL)
Attest:

McCOY M. GIBSON JR.      C. MARSHALL DANN
Attesting Officer      Commissioner of Patents